US007720634B2

(12) United States Patent
Berstis et al.

(10) Patent No.: US 7,720,634 B2
(45) Date of Patent: May 18, 2010

(54) APPARATUS AND METHOD FOR AUTOMATICALLY IMPROVING A SET OF INITIAL RETURN ON INVESTMENT CALCULATOR TEMPLATES

(75) Inventors: Viktors Berstis, Austin, TX (US); Xiaolin Li, Piscataway, NJ (US); Scott Michael Preddy, Blacksburg, VA (US); Brian Scott Stein, Pittsburg, PA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/174,747

(22) Filed: Jul. 17, 2008

(65) Prior Publication Data
US 2008/0306793 A1    Dec. 11, 2008

Related U.S. Application Data (63) Continuation of application No. 10/756,150, filed on Jan. 13, 2004, now Pat. No. 7,603,253.

(51) Int. Cl.
*G06F 3/01* (2006.01)
(52) U.S. Cl. .................. 702/180; 702/179; 702/182; 702/183
(58) Field of Classification Search .................. 702/19, 702/22, 119, 169, 179, 180, 182, 183; 700/97; 714/38; 717/168
See application file for complete search history.

(56) References Cited

U.S. PATENT DOCUMENTS

| | | | |
|---|---|---|---|
| 5,410,598 A | 4/1995 | Shear | 380/4 |
| 5,621,903 A | 4/1997 | Luciw et al. | 395/326 |
| 6,338,149 B1 * | 1/2002 | Ciccone et al. | 714/38 |
| 6,418,462 B1 | 7/2002 | Xu | 709/201 |
| 6,442,164 B1 | 8/2002 | Wu | 370/395.21 |
| 6,587,833 B1 | 7/2003 | Ruffin et al. | 705/11 |
| 6,920,364 B2 * | 7/2005 | Nonaka et al. | 700/97 |
| 7,191,435 B2 * | 3/2007 | Lau et al. | 717/168 |
| 2004/0064269 A1 * | 4/2004 | Shibuya et al. | 702/40 |

OTHER PUBLICATIONS

Fundamentals of Grid Computing, Victor Berstis, Nov. 11, 2002.

* cited by examiner

*Primary Examiner*—Eliseo Ramos Feliciano
*Assistant Examiner*—Felix E Suarez
(74) *Attorney, Agent, or Firm*—Yee & Associates, P.C.; William H. Steinberg; Rudolf O. Siegesmund (57) ABSTRACT

A method for updating the return on investment (ROI) templates used by business consultants. The present invention comprises a Template Evaluation Program (TEP) and a Template Analysis Program (TAP). The TEP compares the default template to the templates modified by the consultants for the customer's ROI analysis and assigns an effectiveness factor to the modified templates. The TAP develops a data list from the default templates and the effectiveness factors and plots the data on a histogram. The TAP performs a statistical analysis for each parameter and updates the default template parameter values if the data fits a normal distribution curve. If the data forms more than one peak on the histogram, then the TAP uses one peak to update the default template and uses the second peak to create a new template. The new template's parameter value is derived from the data in the second peak.

40 Claims, 8 Drawing Sheets

Edit TCO for Resource Group — 130

Tabs: Asset Costs | Operating Costs | Labor Rates and Wages

Hardware
- Server Cost: 15000.0
- Storage Cost: 800.0
- Network Cost: 500.0
- Peripheral Cost: 100.0

Software
- OS License Cost: 900.0
- Database License Cost: 2500.0
- Middleware License Cost: 0.0
- Applications License Cost: 150.0

Implementation
- Design Time (person-hours): 20.0
- Migration Time (person-hours): 30.0
- Porting Time (person-hours): 10.0
- Installation Time (person-hours): 30.0
- Configuration Time (person-hours): 10.0
- Testing Time (person-hours): 40.0

132

[OK] [Cancel]

*FIG. 4*

Edit TCO for Resource Group — 130

*Tabs:* Asset Costs | Operating Costs | Labor Rates and Wages

Personnel

| | |
|---|---|
| Number of System Administration People: | 0.3 |
| Number of H/W Support People: | 0.3 |
| Number of S/W Support People: | 0.3 |

Maintenance and Support Fees

| | |
|---|---|
| H/W M&S Fees: | 100.0 |
| OS Support Fees: | 900.0 |
| Database Support Fees: | 2500.0 |
| Middleware Support Fees: | 1000.0 |
| Application Support Fees: | 150.0 |

— 132

Downtime

| | |
|---|---|
| Cost Per Planned Downtime: | 900.0 |
| Cost Per Unplanned Downtime: | 30.0 |

Facilities

| | |
|---|---|
| Floor Space Per Server: | 10.0 |
| Kilowatts (KW) Per Server: | 30.0 |

[ OK ] [ Cancel ]

Edit TCO for Resource Group

| Asset Costs | Operating Costs | Labor Rates and Wages |

Design Cost (per man-hour): 60.0
Migration Cost (per man-hour): 60.0
Porting Cost (per man-hour): 60.0
Installation Cost (per man-hour): 60.0
Configuration Cost (per man-hour): 60.0
Testing Cost (per man-hour): 60.0
Annual Burden Cost for System Administrator: 65000.0
Annual Burden Costs for H/W M&S: 65000.0
Annual Burden Costs for S/W M&S: 65000.0 ⎬ 132

Downtime

Number of Planned Downtimes (per year): 2
Number of Hours/Server/Year of Unplanned Outage: 1

Facilities

Cost per unit floor space (per year): 48.0
Cost per Kilowatt-Hr (KWH): 0.08

[ OK ]  [ Cancel ]

APPARATUS AND METHOD FOR AUTOMATICALLY IMPROVING A SET OF INITIAL RETURN ON INVESTMENT CALCULATOR TEMPLATES

FIELD OF THE INVENTION

This application is a continuation application of U.S. utility patent application entitled "Apparatus and Method for Automatically Improving a Set of Initial Return on Investment Calculator Templates" filed on Jan. 13, 2004 and accorded Ser. No. 10/756,150 now U.S. Pat. No. 7,603,253 and claims priority therefrom.

FIELD OF THE INVENTION

The present invention is directed generally at a system for improving the accuracy of data templates and specifically at a system for improving return of investment templates used in consulting services.

BACKGROUND OF THE INVENTION

Companies create mathematical models of their business processes in order to predict the outcome of changes to the processes. Frequently, the companies hire consultants to create the models. The use of consultants is beneficial to the company because the consultants have developed accurate mathematical models for the processes of the numerous companies that they have studied. The mathematical models, generally called templates, contain a multiplicity of parameters which must be adjusted for the individual company's industry, location, clients, employees, and other factors. If the input data for the template is accurate, then the template can accurately predict the outcome of changes to the company's processes.

One of the most frequently used templates is a return on investment (ROI) template. A ROI template calculates the amount of money a company will have to spend for a certain process upgrade which reduces the company's operating or processing costs. ROI templates for a computer system upgrade would include industry and context values (information on tax rates, labor rates, etc.), computing cluster values (information on the number of CPUs, their speed, and their memory), application values (information on how the applications are executed), the types of computers the company uses, and organizational data about the computer system. Perhaps the most important aspect of the ROI template is that it calculates the time required to recapture the money expended in the process upgrade. If a consultant has accurate data regarding the input costs, and the ROI template is accurate in modeling the company's processes, then the template can accurately predict the cost savings and the company's return on its investment in the process upgrade. Consequently, consultants expend significant amounts of time and energy in modifying the templates so that they accurately model the company's processes. Therefore, a need exists for a method of capturing the consultants' modifications to the default template and rating the effectiveness of the consultants' modifications.

While many consultants modify the default templates for their customers, consulting firms are particularly interested in the modified templates which most accurately reflect the customer's processes. If a particular modification were more accurate than the default template, then it would be useful to update the default template to reflect the more accurate modified template. Sometimes, the extent of the modifications to the templates signifies the need to create a new default template. Therefore, a need exists for a method of analyzing the modified templates and using the modified templates to update the default template and create new templates.

The prior art has previously addressed the problem of updating templates. For example, U.S. Pat. No. 6,338,149 (the '149 patent) entitled "Change Monitoring System for a Computer System" discloses a method for detecting changes to templates in a computer network. The '149 patent reviews the modifications to the templates and determines if they are desirable. What is needed beyond the '149 patent is a system for rating the effectiveness of the templates and using the modified templates to update the default template and create new templates.

SUMMARY OF THE INVENTION

The present invention, which meets the needs stated above, is a method for updating the return on investment (ROI) templates used by business consultants. The software embodiment of the present invention comprises a Template Evaluation Program (TEP) and a Template Analysis Program (TAP). The TEP compares the default template to the templates modified by the consultants for the customer's ROI analysis. The TEP then assigns an effectiveness factor to the modified templates based on the number of modifications that the consultant had to make to the default template. The TEP may be a manual or an automated process.

The TAP collects the modified templates and the effectiveness factors and develops a data list from the default templates and the effectiveness factors. For each parameter in the default template, the TAP plots the data from the modified templates on a histogram. The TAP also performs a statistical analysis for the data points for each parameter. If the data for the parameter forms a normal distribution curve with a single peak or a curve determined to be sufficiently close to a normal distribution curve, then the TAP averages the data points with the parameter value in the default template to produce an updated template value. If the data forms more than one peak on the histogram, the TAP determines if one of the averages of one of the peaks is within one standard deviation (or some other user configurable threshold) of the default parameter value. If so, then the data for that peak is averaged into the default template to create an updated template. The TAP then performs a statistical analysis on the remaining peaks. If the standard deviation for any peak is less than a template creation threshold, then the TAP creates a new template using the average of the analyzed peak data for the new template parameter value. The TAP continues the analysis for every parameter in the template until all of the parameters have been analyzed.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

As used herein, the term "analyze" shall mean to perform a statistical evaluation of a set of data.

As used herein, the term "computer" shall mean a machine having a processor, a memory, and an operating system, capable of interaction with a user or other computer, and shall include without limitation desktop computers, notebook computers, personal digital assistants (PDAs), servers, handheld computers, and similar devices.

As used herein, the term "default template" shall mean a template in which the parameter values are determined prior to template distribution.

As used herein, the term "effectiveness factor" shall mean a quantitative measure of the extent of modification of a default template.

As used herein, the term "modify" shall mean to change the parameter values in a template by a consultant or other user.

As used herein, the term "modified template" shall mean a template which has been modified by a consultant.

As used herein, the term "new template" shall mean a template created by the present invention.

As used herein, the term "parameter" shall mean an input variable for a template.

As used herein, the term "template" shall mean a mathematical device which uses a plurality of parameters to calculate a desired output.

As used herein, the term "template creation threshold" shall mean a criterion used to determine whether a new template should be created.

As used herein, the term "update" shall mean to change the parameter values in a template.

As used herein, the term "updated template" shall mean a template updated by the present invention.

As used herein, the term "value" shall mean a numerical entry into a template for a parameter.

Figure 1:
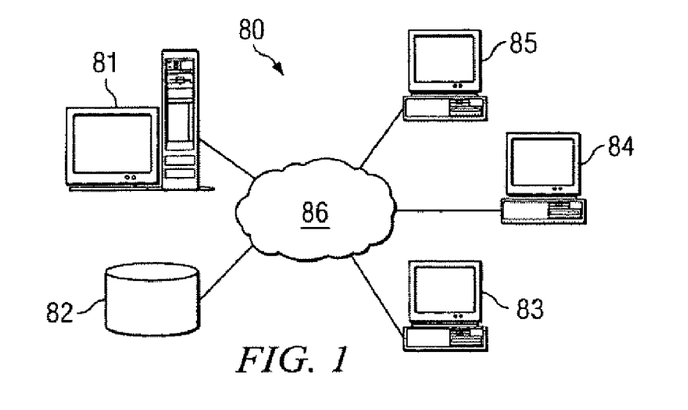
FIG. 1 is an illustration of the computer network associated with the present invention.

FIG. 1 is an illustration of computer network 80 associated with the present invention. Computer network 80 comprises local computer 85 electrically coupled to network 86. Local computer 85 is electrically coupled to remote computer 84 and remote computer 83 via network 86. Local computer 85 is also electrically coupled to server 81 and database 82 via network 86. Network 86 may be a simplified network connection such as a local area network (LAN) or may be a larger network such as a wide area network (WAN) or the Internet. Furthermore, computer network 80 depicted in FIG. 1 is intended as a representation of a possible operating network that may contain the present invention and is not meant as an architectural limitation.

Figure 2:
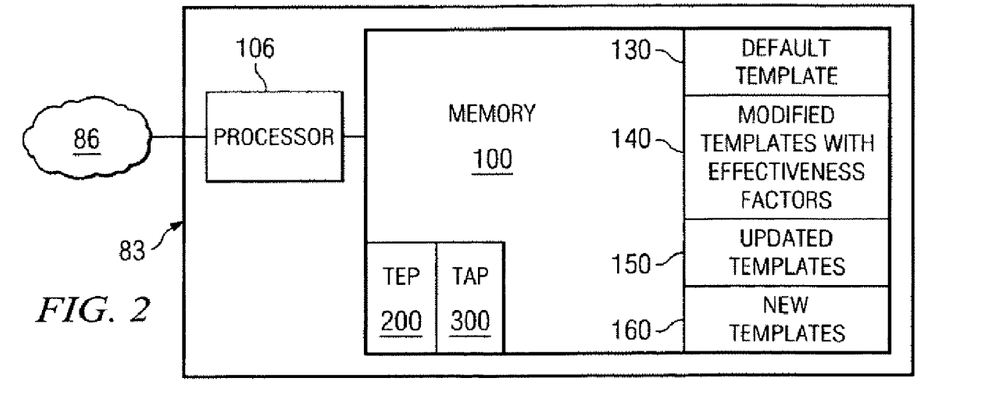
FIG. 2 is an illustration of a computer associated with the present invention.

The internal configuration of a computer, including connection and orientation of the processor, memory, and input/output devices, is well known in the art. The present invention is a methodology that can be embodied in a computer program. Referring to FIG. 2, the methodology of the present invention is implemented on software by Template Evaluation Program (TEP) 200 and Template Analysis Program (TAP) 300. TEP 200 and TAP 300 described herein can be stored within the memory of any computer depicted in FIG. 1. Alternatively, TEP 200 and TAP 300 can be stored in an external storage device such as a removable disk, a CD-ROM, or a USB storage device. Memory 100 is illustrative of the memory within one of the computers of FIG. 1. Memory 100 also contains default template 130 and modified templates with effectiveness factor 140. The present invention may interface with default template 130 and modified templates with effectiveness factor 140 through memory 100. TEP 200 and/or TAP 300 may produce the effectiveness factor in modified templates with effectiveness factor 140, updated templates 150, and/or new templates 160. As part of the present invention, the memory 100 can be configured with TEP 200 and/or TAP 300. Processor 106 can execute the instructions contained in TEP 200 and/or TAP 300. Processor 106 and memory 100 are part of a computer such as remote computer 83 in FIG. 1. Processor 106 can communicate with other computers via network 86.

In alternative embodiments, TEP 200 and/or TAP 300 can be stored in the memory of other computers. Storing TEP 200 and/or TAP 300 in the memory of other computers allows the processor workload to be distributed across a plurality of processors instead of a single processor. Further configurations of TEP 200 and/or TAP 300 across various memories are known by persons of ordinary skill in the art.

Figure 3:
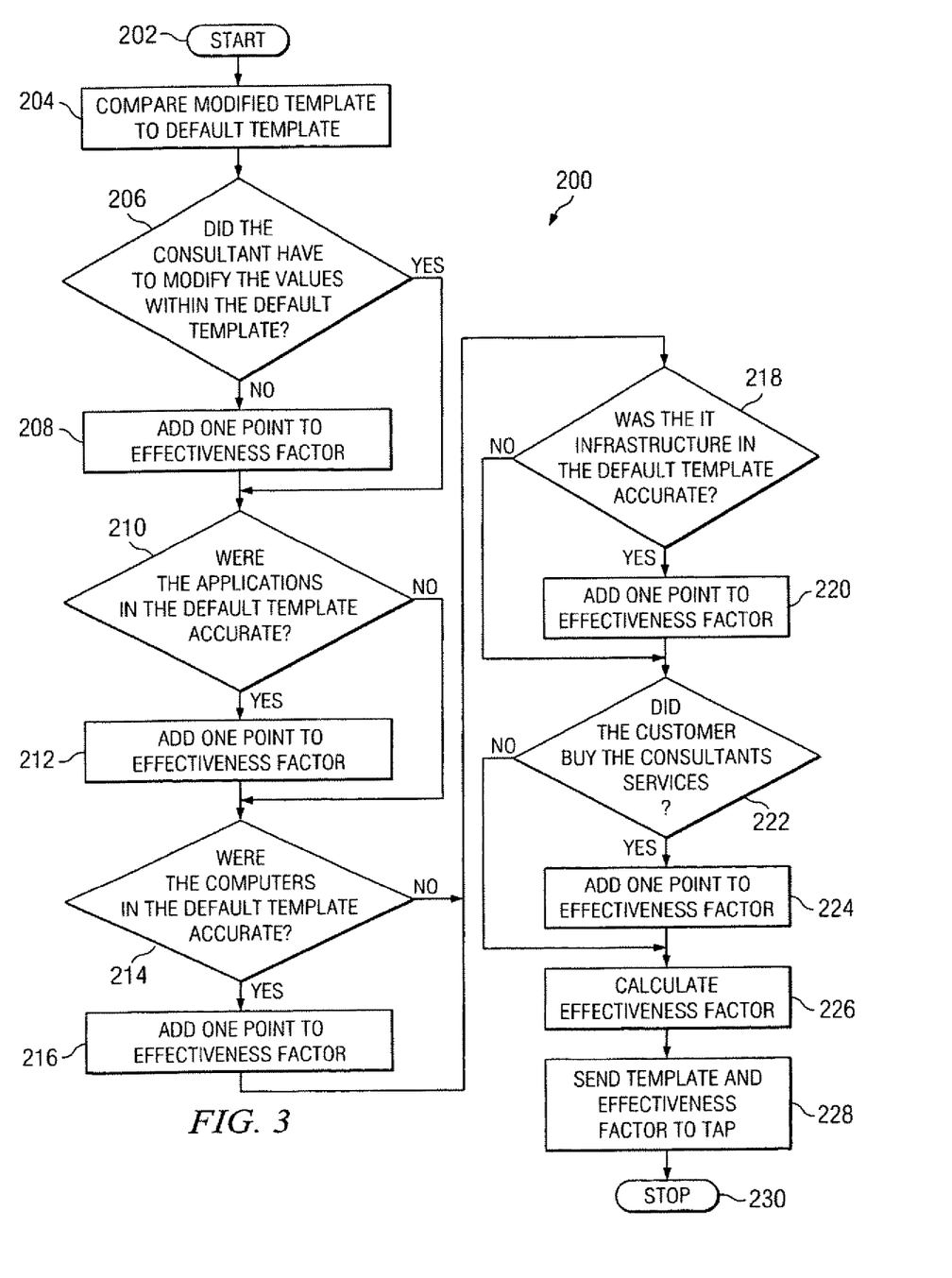
FIG. 3 is an illustration of the logic of the Template Evaluation Program (TEP) of the present invention.

Turning to FIG. 3, the logic of Template Evaluation Program (TEP) 200 is illustrated. TEP 200 is a program that allows a consultant or other user to rate the effectiveness of the default template and calculate the effectiveness factor. Alternatively, the consultant could manually assign an effectiveness factor to the default template. The effectiveness factor is initially set to zero and TEP 200 adds points to the effectiveness factor based on the consultant's modification of the default template. The assignment of the specific number of points to each element listed below is configurable to user-specific applications. Thus, a person of ordinary skill in the art can choose to assign more points to some elements herein than others. The example illustrated in FIG. 3 applies to a default template for grid computing services. TEP 200 begins (202) when the consultant desires to evaluate the effectiveness of the default template. TEP 200 compares the default template to the template the consultant modified for use with the customer (204). TEP 200 makes a determination whether the consultant modified the values in the default template (206). If desired, at step 206 TEP 200 can alternately determine if the consultant modified the template values more than a selected percentage (i.e. ten percent). If TEP 200 determines that the consultant did not modify the template values, then TEP 200 adds one point to the effectiveness factor (208) and proceeds to step 210. Template values may be like parameters 132 in default template 130, illustrated in FIGS. 4-6.

At step 210, TEP 200 determines if the applications in the template were accurate (210). If the applications in the template were accurate, then TEP 200 adds a point to the effectiveness factor (212) and proceeds to step 214. The accuracy of the applications may be configured by changing parameters 134 for the application in default template 130, illustrated in FIG. 7. At step 214, TEP 200 determines if the computers in the template were accurate (214). If the computers in the template were accurate, then TEP 200 adds a point to the effectiveness factor (216) and proceeds to step 218. The accuracy of the computers may be configured by changing parameters 136 for the computer in default template 130, illustrated in FIG. 8. At step 218, TEP 200 determines if the Information Technology (If) infrastructure in the template was accurate (218). If the IT infrastructure in the template was accurate, then TEP 200 adds a point to the effectiveness factor (220) and proceeds to step 222. The accuracy of the applications may be configured by changing layout 138 of the IT infrastructure in default template 130, illustrated in FIG. 9. At step 222, TEP 200 determines if the customer purchased the consultant's services (222). If the customer purchased the consultants services, then TEP 200 adds a point to the effectiveness factor (224) and proceeds to step 226. TEP 200 then calculates the effectiveness factor by summing all of the points added to the effectiveness factor (226). TEP 200 sends the modified template and the effectiveness factor to TAP 300 (228) then ends (230).

Figure 7:
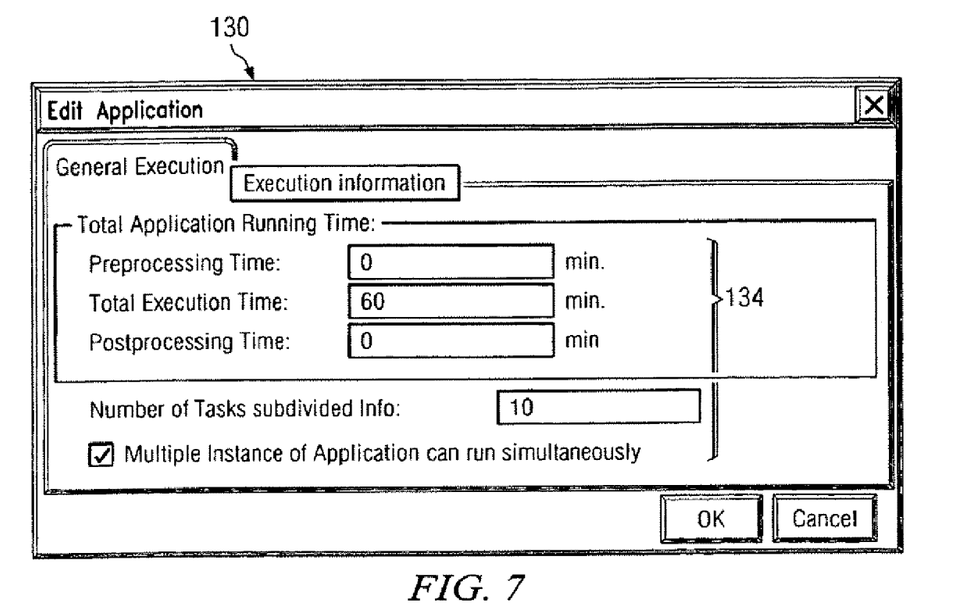
FIG. 7 is an illustration of a portion of the template of the present invention.
Figure 8:
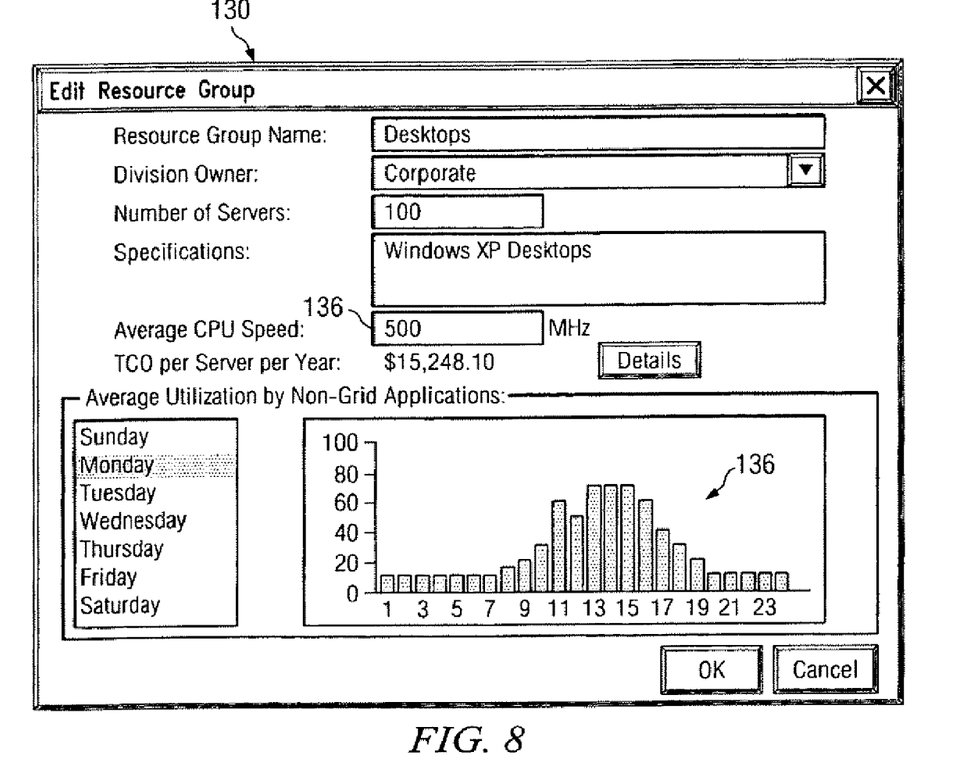
FIG. 8 is an illustration of a portion of the template of the present invention.
Figure 9:
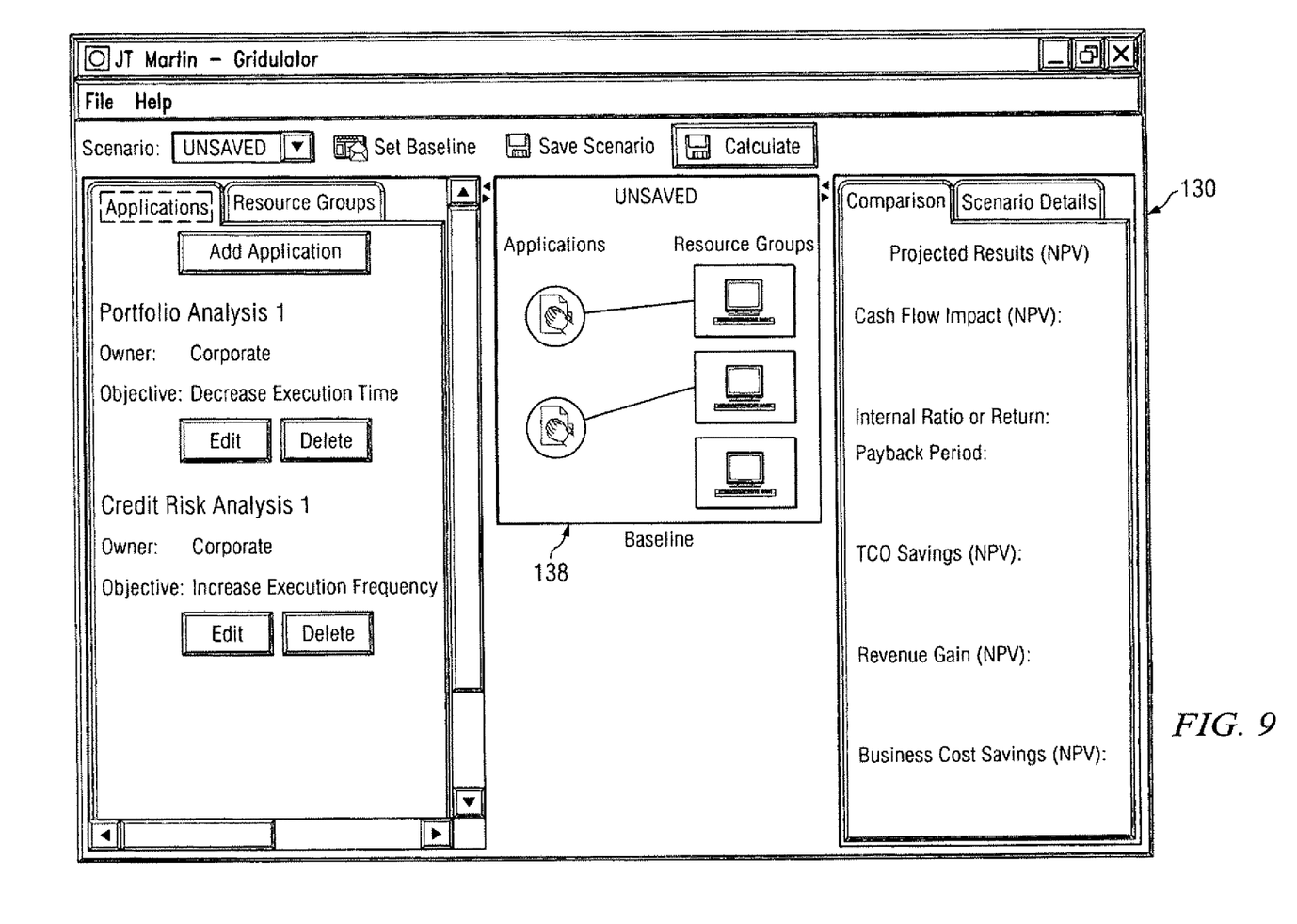
FIG. 9 is an illustration of a portion of the template of the present invention.

FIGS. 4-9 illustrate the ROI templates used by a consultant in modeling grid computing systems. Grid computing systems are computer systems which break up applications into small processing jobs and distribute the smaller processing jobs to a plurality of computer CPUs based on the CPUs' idle time. Thus, an application can be processed faster without a noticeable decrease in computer network performance. The parameters which are required for the default template for a grid computing system are asset costs (FIG. 4), operating costs (FIG. 5), labor rates and wages (FIG. 6), execution information about the applications (FIG. 7), information regarding the company's computers and other resources (FIG. 8), and information regarding the company's layout of computers to applications (FIG. 9). While grid computing ROI templates are used to illustrate the present invention, the present invention may be applied to any type of template or other tool used to model a process.

Figure 4:
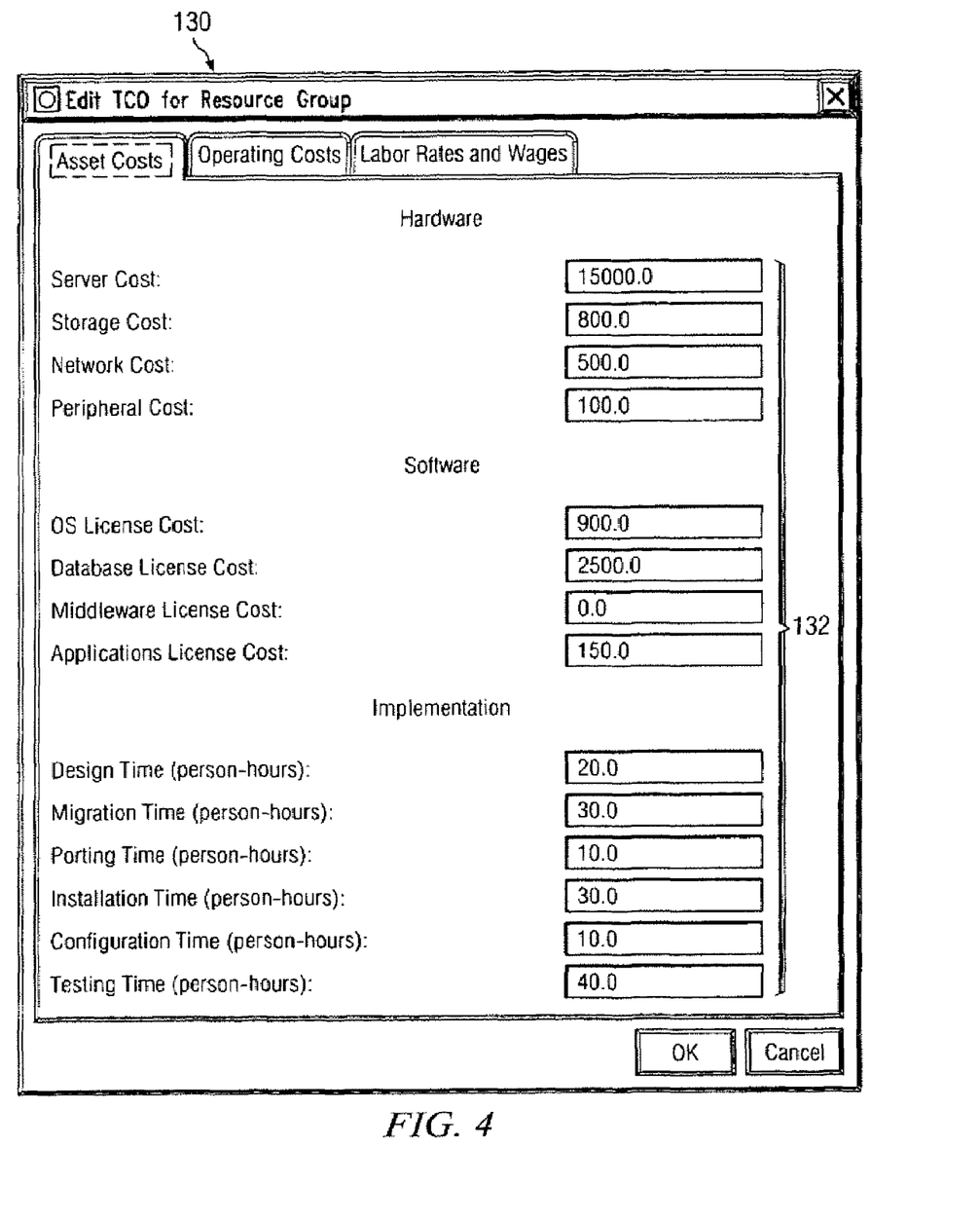
FIG. 4 is an illustration of a portion of the template of the present invention.
Figure 5:
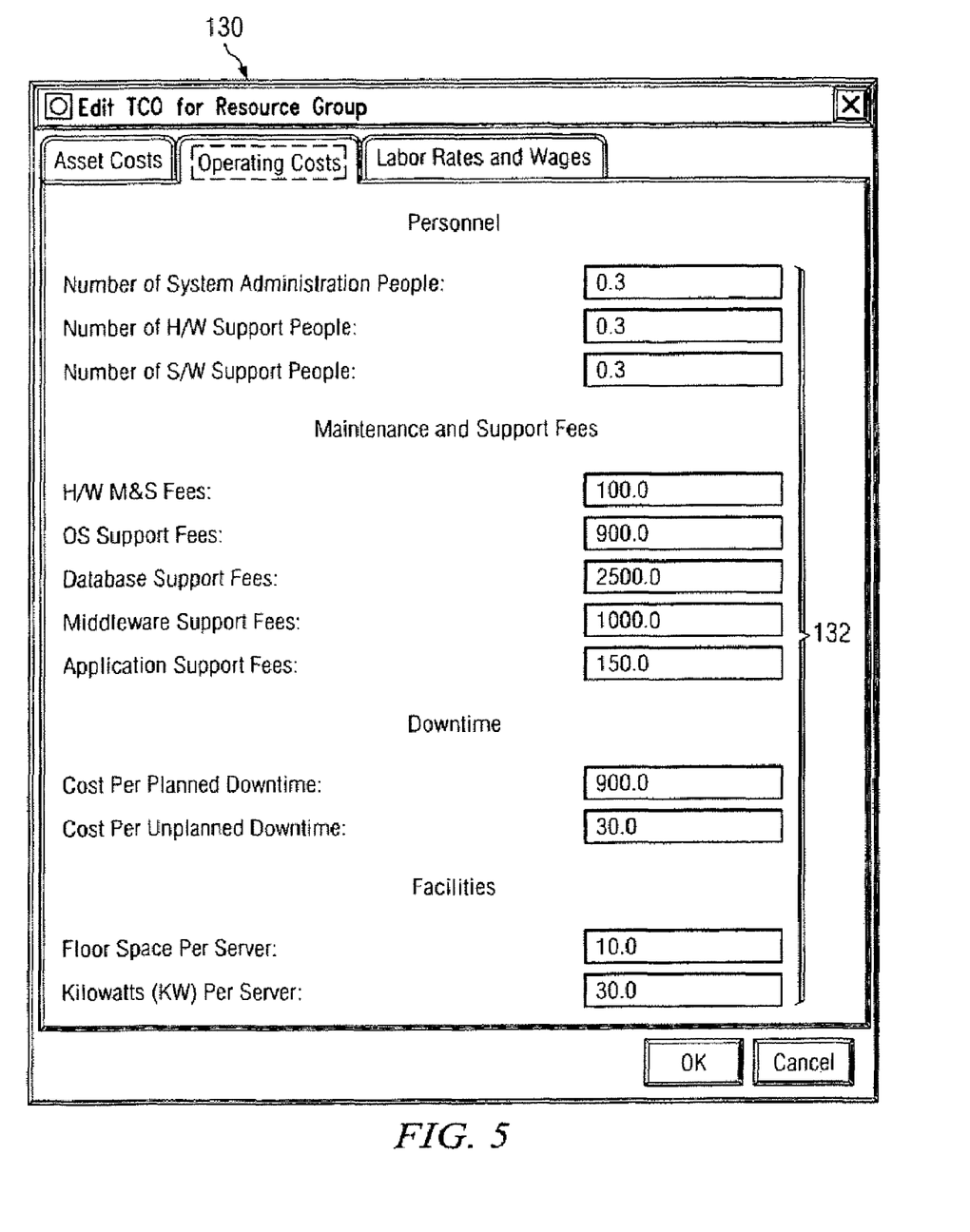
FIG. 5 is an illustration of a portion of the template of the present invention.
Figure 6:
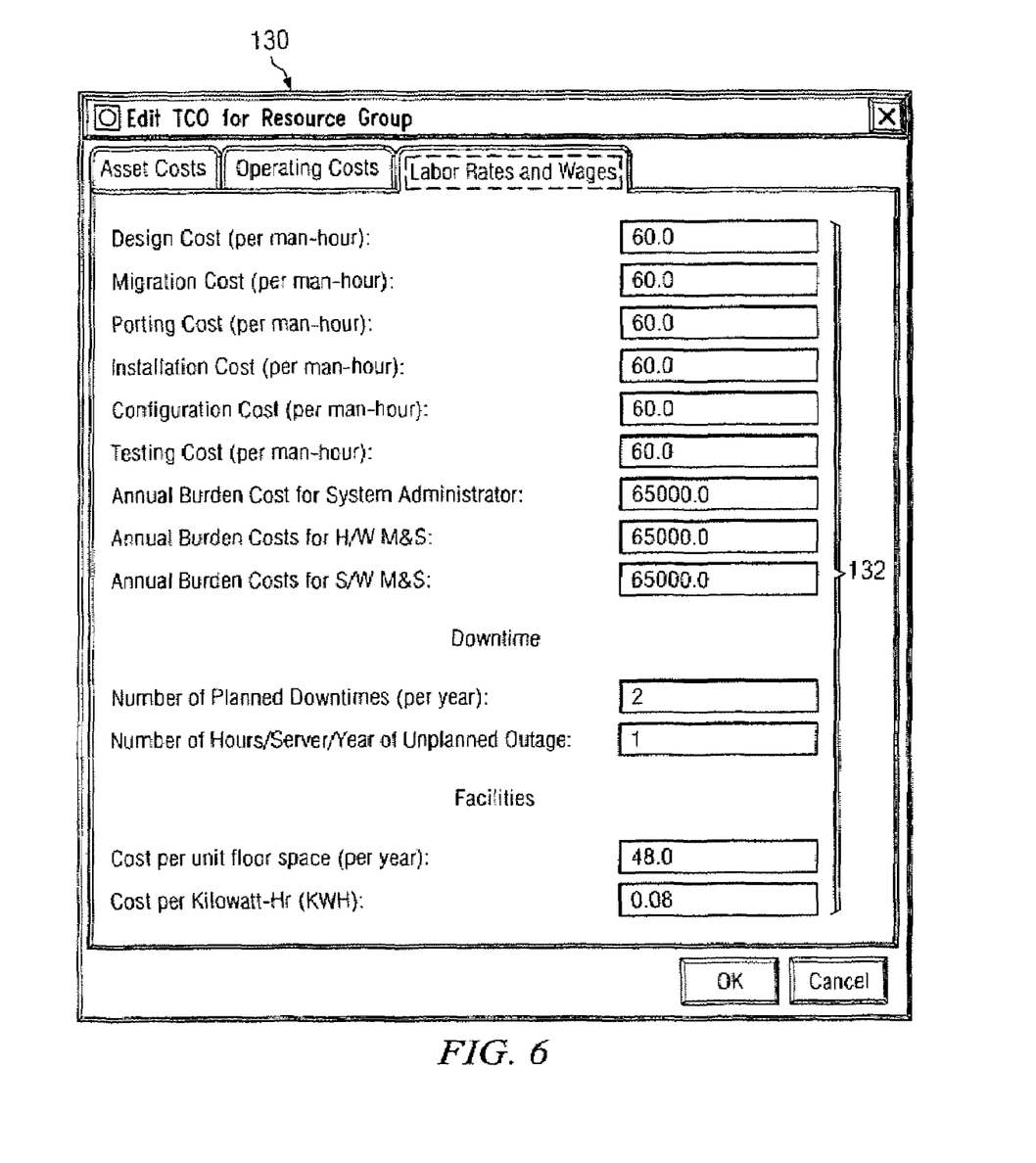
FIG. 6 is an illustration of a portion of the template of the present invention.

Turning to FIGS. 4-6, parameters 132 for default template 130 are illustrated. Parameters 132 are default data populated into the template based on the customer's location and industry. A consultant may modify the value of parameters 132 in default template 130 to create a modified template. A consultant would modify the value of parameters 132 in order to create a more accurate ROI scenario for the customer.

Turning to FIG. 7, the value of parameters 134 for applications in default template 130 is illustrated. Applications are computer applications which run on the customer's computers. Parameters 134 are populated in the template based on the customer's location, industry, and characteristics of the applications.

Turning to FIG. 8, the value of parameters 136 for computers in default template 130 is illustrated. Computers are the machines which run on the customer's applications. Parameters 136 are populated in the template based on the customer's location, industry, and characteristics of the computers.

Turning to FIG. 9, a simplified version of layout 138 of the customer's IT connectivity is illustrated. Layout 138 depicts the correlation between the computers and the applications. Layout 138 is an example of another type of parameter and is populated in the template based on the customer's location, industry, and characteristics of the computers and applications.

Figure 10:
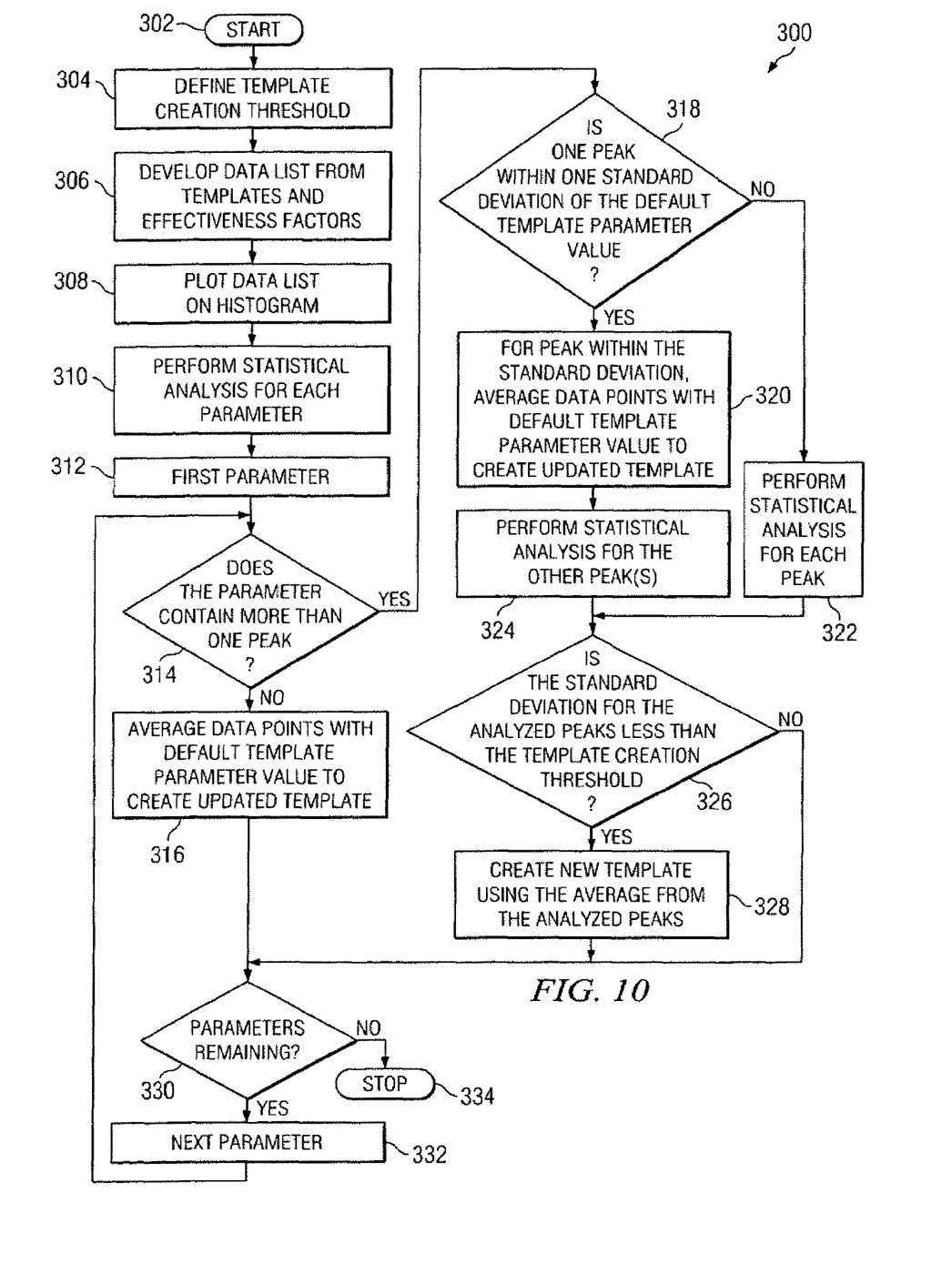
FIG. 10 is an illustration of the logic of the Template Analysis Program (TAP) of the present invention.

Turning to FIG. 10, the logic of Template Analysis Program (TAP) 300 is illustrated. TAP 300 is a program that analyses the modified templates, updates the default template, and creates new templates. TAP 300 starts (302) anytime the user wants to update the default template and possibly create a new template. The user must define a template creation threshold so that TAP 300 knows when to create a new template (304). Alternatively, TAP 300 can use a default threshold such as a greater number of data points at a second peak than at the default template value. TAP 300 then develops a data list from the modified templates and their effectiveness factors (306). The data list is developed from the parameter values in the modified template. In developing the data list, TAP 300 weights the data in the modified templates according to their effectiveness factors. Weighting the modified template data allows the modified templates with the higher effectiveness factors to be given more weight in analysis than the modified templates with lesser effectiveness factors. One method for weighting the modified template values is to multiply the occurrence of a modified template value by the effectiveness factor. Using this method, the data in a modified template with an effectiveness factor of two would be recorded twice and the data in a modified template with an effectiveness factor of one would be recorded once. Persons of ordinary skill in the art are aware of other methods of weighting effectiveness factors and data points.

Figure 11:
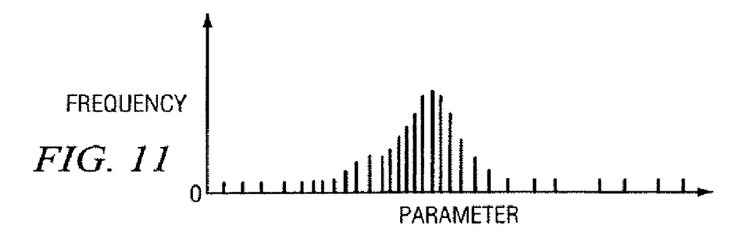
FIG. 11 is an illustration of the single peak histogram associated with the present invention.
Figure 12:
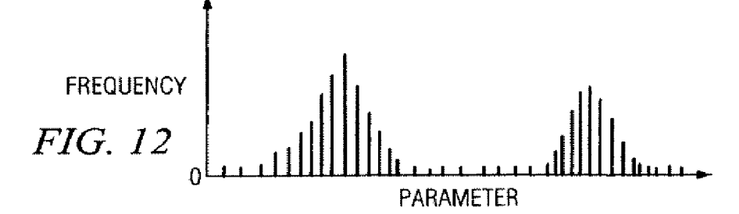
FIG. 12 is an illustration of the double peak histogram associated with the present invention.

After the data list has been developed, TAP 300 plots the data for each parameter on a histogram (308). A histogram is a chart displaying the frequency of data points for each parameter. The present invention plots the data on a type of histogram in which each axis is a parameter. Therefore, the histogram will have one axis for every parameter in the default template. Each of the axes for the histogram is orthogonal to the other axes such that the data from each modified template may be plotted in multi-dimensional space within the computer's memory. For the sake of simplicity of illustration of a histogram, FIGS. 11 and 12 illustrate examples of histograms for a single parameter. TAP 300 then performs a statistical analysis of the data points for each parameter (310). Persons of ordinary skill in the art are aware of methods for performing a statistical analysis on a set of data including calculating the average, median, mode, norm, standard deviation, and/or variance. TAP 300 then analyzes the first parameter (312) and determines if the histogram contains more than one peak (314). FIG. 11 depicts a histogram with one peak. FIG. 12 depicts a histogram with more than one peak. Returning to FIG. 10, if TAP 300 determines that the parameter contains only one peak, then TAP 300 averages the data points with the default template parameter value to create an updated template parameter value (316) and proceeds to step 330.

If at step 314, TAP 300 determines that the parameter contains more than one peak, TAP 300 makes a determination whether one peak is within one standard deviation of the default template parameter value (318). A user may choose to define the threshold value as other than one standard deviation. If one peak is not within one standard deviation of the default template parameter value, then TAP 300 performs a statistical analysis on each peak (322). If one peak is within one standard deviation of the default template parameter value, then TAP 300 averages the data points associated with that peak into the default template parameter value (320). Persons of ordinary skill in the art are aware of methods for separating the data points associated with a first peak from the data points associated with a second peak in a histogram. TAP 300 then performs a statistical analysis for each of the remaining peaks (324) and proceeds to step 326.

At step 326, TAP 300 determines if the standard deviation for the peaks analyzed in steps 322 or 324 is less than the template creation threshold (326). The template creation threshold is calculated by determining if there are more than some number, n, of successful templates within a deviation from a newly found peak. If the standard deviation for the analyzed peaks is not less than the template creation threshold, then TAP 300 proceeds to step 330. If the standard deviation for the analyzed peaks is less than the template creation threshold, then TAP 300 creates a new template using the average from the analyzed peaks (328). If a new template was created when TAP 300 iterated through steps 314-332 for a previous parameter, then TAP 300 can save the average from the analyzed peaks as a new default parameter value in the template created on the previous iteration. At step 330, TAP 300 determines if there are any parameters remaining in the default template (330). If there are parameters remaining, then TAP 300 goes to the next parameter (332) and returns to step 314. If there are not any parameters remaining, then TAP 300 ends (334).

With respect to the above description, it is to be realized that the optimum dimensional relationships for the parts of the invention, including variations in size, materials, shape, form, function, manner of operation, assembly, and use, are deemed readily apparent and obvious to one of ordinary skill in the art. All equivalent relationships to those illustrated in the drawings and described in the specification are intended to be encompassed by the present invention. The novel spirit of the present invention is still embodied by reordering or deleting some of the steps contained in this disclosure. The spirit of the invention is not meant to be limited in any way except by proper construction of the following claims.

What is claimed is:

1. A computer-implemented method comprising:
   responsive to a consultant modifying a default template to form a plurality of modified templates in order to calculate an amount of money a customer will spend for a process upgrade, comparing, by a processor of a computer, the default template to the modified template:
   assigning, by the processor, an effectiveness factor to the modified template, wherein the effectiveness factor is based on a number of modifications that the consultant made to the default template, an accuracy of each of a plurality of applications in the template, an accuracy of each of a plurality of computers in the template, an accuracy of an information technology infrastructure of the customer, and whether the customer made a purchase;
   developing, by the processor, a data list from the modified template and the effectiveness factor;
   plotting, by the processor, the data list on a histogram;
   analyzing, by the processor, the histogram;
   responsive to analyzing the histogram, creating, by the processor, a new template that calculates the amount the customer will spend for the process upgrade.

2. The method of claim 1 further comprising:
   responsive to a determination that the histogram contains one peak, updating, by the processor, a default template parameter value;
   responsive to a determination that the histogram contains more than one peak, determining, by the processor, if the default template parameter value is within one standard deviation of a histogram peak;
   responsive to a determination that the default template parameter value is within one standard deviation of the histogram peak, updating, by the processor, the default template parameter value using the data for the peak which is within one standard deviation of the default template parameter value; and
   responsive to a determination that the default template parameter value is within one standard deviation of the histogram peak, analyzing, by the processor, any histogram peaks that are not within one standard deviation of the default template parameter value.

3. The method of claim 2 further comprising:
   responsive to a determination that the default template parameter value is not within one standard deviation of any of the histogram peaks, analyzing, by the processor, a histogram peak;
   determining, by the processor, if a standard deviation for the histogram peak is less than a template creation threshold; and
   responsive to a determination that the standard deviation for the analyzed peak is less than the template creation threshold, creating, by the processor, the new template using the average from the analyzed peak.

4. The method of claim 3 further comprising: repeating the steps in claim 3 for every parameter in the default template.

5. The method of claim 2 wherein updating the default template parameter value comprises: averaging a modified template parameter value with the default template parameter value to obtain an updated template parameter value.

6. The method of claim 1 wherein developing the data list comprises: adjusting a modified template parameter value using the effectiveness factor; and recording the modified template parameter value in the data list.

7. The method of claim 1 wherein the effectiveness factor is determined using a second method comprising:
   comparing, by the processor, the modified template to a default template;
   increasing, by the processor, the effectiveness factor when the consultant does not have to modify a default template parameter value; and
   increasing, by the processor, the effectiveness factor when the default template accurately represents a company's processes.

8. A computer-implemented method comprising:
   responsive to a consultant modifying a default template to form a modified template in order to calculate an amount of money a customer will spend for a process upgrade, comparing, by a processor of a computer, the default template to the modified template:
   assigning, by the processor, an effectiveness factor to the modified template, wherein the effectiveness factor is based on a number of modifications that the consultant made to the default template;
   developing, by the processor, a data list from the modified template and the effectiveness factor;
   plotting, by the processor, the data list on a histogram;
   analyzing, by the processor, a plurality of peaks on the histogram;
   determining, by the processor, if a default template parameter value is within one standard deviation of a histogram peak;
   responsive to a determination that the default template parameter value is within one standard deviation of a histogram peak, updating, by the processor, the default template parameter value using the data for the peak which is within one standard deviation of the default template parameter value;
   responsive to a determination that the default template parameter value is within one standard deviation of a histogram peak, analyzing, by the processor, any peaks that are not within one standard deviation of the default template parameter value;

responsive to a determination that the default template parameter value is not within one standard deviation of any of the histogram peaks, analyzing, by the processor, a histogram peak:
determining, by the processor, if a standard deviation for the histogram peak is less than the template creation threshold; and
responsive to a determination that the standard deviation for the histogram peak is less than the template creation threshold, creating, by the processor, a new template using the average from the analyzed peaks, wherein the new template calculates the amount the customer will spend for the process upgrade.

9. The method of claim 8 further comprising:
determining if the histogram contains more than one peak;
responsive to a determination that the histogram contains one peak, updating a default template parameter value; and
wherein the analyzing a plurality of peaks on a histogram step occurs responsive to a determination that the histogram contains more than one peak.

10. The method of claim 8 further comprising: repeating the steps in claim 8 for every parameter in the default template.

11. The method of claim 8 wherein updating the default template parameter value comprises: averaging a modified template parameter value with the default template parameter value to obtain an updated template parameter value.

12. The method of claim 8 wherein developing the data list comprises: adjusting a modified template parameter value using the effectiveness factor; and recording the modified template parameter value in the data list.

13. The method of claim 8 wherein the effectiveness factor is determined using a second method comprising:
comparing the modified template to a default template;
increasing the effectiveness factor when the consultant does not have to modify a default template parameter value; and
increasing the effectiveness factor when the default template accurately represents a company's processes.

14. An apparatus comprising:
a computer having a processor and connected to a storage;
a program stored in the storage, the program containing a plurality of instructions adapted to cause the processor to the following perform comprising:
responsive to a consultant modifying a default template to form a modified template for a customer's return on investment analysis, comparing the default template to the modified template;
assigning an effectiveness factor to the modified template, wherein the effectiveness factor is based on a number of modifications that the consultant made to the default template;
developing a data list from the modified template and the effectiveness factor:
plotting the data list on a histogram;
analyzing the histogram:
responsive to analyzing the histogram, creating, by the processor, a new template that calculates the amount the customer will spend for the process upgrade.

15. The apparatus of claim 14 further comprising:
determining if a standard deviation for a histogram peak on the histogram is less than a template creation threshold;
responsive to a determination that the standard deviation for the histogram peak is less than the template creation threshold, creating a new template using the average from the analyzed peak;
responsive to a determination that the histogram contains more than one peak, determining if a default template parameter value is within one standard deviation of a histogram peaks;
responsive to a determination that the default template parameter value is within one standard deviation of the histogram peak, updating the default template parameter value using the data for the peak which is within one standard deviation of the default template parameter value; and
responsive to a determination that the default template parameter value is within one standard deviation of the histogram peak, analyzing any peaks that are not within one standard deviation of the default template parameter value.

16. The apparatus of claim 14 further comprising:
responsive to a determination that the default template parameter value is not within one standard deviation of the histogram peak, analyzing a histogram peak;
determining if a standard deviation for the histogram peak is less than the template creation threshold; and
responsive to a determination that the standard deviation for the analyzed peak is less than the template creation threshold, creating a new template using the average from the analyzed peak.

17. The apparatus of claim 14 further comprising:
determining if the histogram contains more than one peak; and
responsive to a determination that the histogram contains one peak, updating a default template parameter value.

18. The apparatus of claim 14 further comprising: repeating the steps in claim 16 for every parameter in the default template.

19. The apparatus of claim 14 wherein updating the default template parameter value comprises: averaging a modified template parameter value with the default template parameter value to obtain an updated template parameter value.

20. The apparatus of claim 14 wherein developing the data list comprises: adjusting a modified template parameter value using the effectiveness factor; and recording the modified template parameter value in the data list.

21. The apparatus of claim 14 wherein the effectiveness factor is determined using a second method comprising:
comparing the modified template to a default template;
increasing the effectiveness factor when a consultant does not have to modify a default template parameter value; and
increasing the effectiveness factor when the default template accurately represents a company's processes.

22. A program product operable on a computer, the program product comprising:
a computer-usable storage medium;
wherein the computer usable storage medium comprises a plurality of instructions comprising:
instructions for, responsive to a consultant modifying a default template to form a modified template in order to calculate an amount of money a customer will spend for a process upgrade, comparing, by a processor of a computer, the default template to the modified template:
instructions for assigning an effectiveness factor to the modified template, wherein the effectiveness factor is based on a number of modifications that the consultant made to the default template;
instructions for developing a data list from the modified template and the effectiveness factor;
instructions for plotting the data list on a histogram;

instructions for analyzing the histogram;
responsive to analyzing the histogram, creating, by the processor, a new template that calculates the amount the customer will spend for the process upgrade.

23. The program product of claim 22 further comprising:
instructions for determining if the histogram contains more than one peak;
responsive to a determination that the histogram contains one peak, instructions for updating a default template parameter value:
responsive to a determination that the histogram contains more than one peak,
instructions for determining if the default template parameter value is within one standard deviation of a histogram peak;
responsive to a determination that the default template parameter value is within one standard deviation of the histogram peak, instructions for updating the default template parameter value using the data for the peak which is within one standard deviation of the default template parameter value; and
responsive to a determination that the default template parameter value is within one standard deviation of the histogram peak, instructions for analyzing any histogram peaks that are not within one standard deviation of the default template parameter value.

24. The program product of claim 23 further comprising:
responsive to a determination that the default template parameter value is not within one standard deviation of any of the histogram peaks, instructions for analyzing a histogram peak;
instructions for determining if a standard deviation for the histogram peak is less than a template creation threshold; and
responsive to a determination that the standard deviation for the analyzed peak is less than the template creation threshold, instructions for creating a new template using the average from the analyzed peak.

25. The program product of claim 24 further comprising: repeating the steps in claim 27 for every parameter in the default template.

26. The program product of claim 23 wherein the instructions for updating the default template parameter value comprise: instructions for averaging a modified template parameter value with the default template parameter value to obtain an updated template parameter value.

27. The program product of claim 22 wherein the instructions for developing the data list comprise: instructions for adjusting a modified template parameter value using the effectiveness factor; and instructions for recording the modified template parameter value in the data list.

28. The program product of claim 22 wherein the effectiveness factor is determined using a second set of instructions comprising:
instructions for comparing the modified template to a default template;
instructions for increasing the effectiveness factor when a consultant does not have to modify a default template parameter value; and
instructions for increasing the effectiveness factor when the default template accurately represents a company's processes.

29. A program product operable on a computer, the program product comprising:
a computer-usable medium;
wherein the computer usable medium comprises instructions comprising:
instructions for, responsive to a consultant modifying a default template to form a modified template in order to calculate an amount of money a customer will spend for a process upgrade, comparing, by a processor of a computer, the default template to the modified template;
instructions for assigning an effectiveness factor to the modified template, wherein the effectiveness factor is based on a number of modifications that the consultant made to the default template;
instructions for developing a data list from the modified template and the effectiveness factor;
instructions for plotting the data list on a histogram;
instructions for analyzing a plurality of peaks on the histogram;
instructions for determining if a default template parameter value is within one standard deviation of a histogram peak;
responsive to a determination that the default template parameter value is within one standard deviation of a histogram peak, instructions for updating the default template parameter value using the data for the peak which is within one standard deviation of the default template parameter value;
responsive to a determination that the default template parameter value is within one standard deviation of a histogram peak, instructions for analyzing any peaks that are not within one standard deviation of the default template parameter value;
responsive to a determination that the default template parameter value is not within one standard deviation of any of the histogram peaks, instructions for analyzing a histogram peak;
instructions for determining if a standard deviation for the histogram peak is less than the template creation threshold; and
responsive to a determination that the standard deviation for the histogram peak is less than the template creation threshold, instructions for creating a new template using the average from the analyzed peaks, wherein the new template calculates the amount the customer will spend for the process upgrade.

30. The program product of claim 29 further comprising:
instructions for determining if the histogram contains more than one peak; responsive to a determination that the histogram contains one peak, instructions for updating a default template parameter value; and
wherein the instructions for analyzing a plurality of peaks on a histogram step occurs responsive to a determination that the histogram contains more than one peak.

31. The program product of claim 29 further comprising: repeating the steps in claim 32 for every parameter in the default template.

32. The program product of claim 29 wherein the instructions for updating the default template parameter value comprise: averaging a modified template parameter value with the default template parameter value to obtain an updated template parameter value.

33. The program product of claim 29 wherein the instructions for developing the data list comprise: adjusting a modified template parameter value using the effectiveness factor; and recording the modified template parameter value in the data list.

34. The program product of claim 29 wherein the effectiveness factor is determined using a second set of instructions comprising:

instructions for comparing the modified template to a default template;

instructions for increasing the effectiveness factor when a consultant does not have to modify a default template parameter value; and instructions for increasing the effectiveness factor when the default template accurately represents a company's processes.

35. A program product operable on a computer, the program product comprising: a computer-usable medium;

wherein the computer usable medium comprises instructions comprising:

instructions for, responsive to a consultant modifying a default template to form a modified template in order to calculate an amount of money a customer will spend for a process upgrade, comparing, by a processor of a computer, the default template to the modified template;

instructions for assigning an effectiveness factor to the modified template, wherein the effectiveness factor is based on a number of modifications that the consultant made to the default template;

instructions for developing a data list from the modified template and the effectiveness factor;

instructions for plotting the data list on a histogram;

instructions for determining if a standard deviation for a histogram peak is less than a template creation threshold;

responsive to a determination that the standard deviation for the histogram peak is less than the template creation threshold, instructions for creating a new template using the average from the analyzed peak;

responsive to a determination that the histogram contains more than one peak, instructions for determining if a default template parameter value is within one standard deviation of a histogram peak;

responsive to a determination that the default template parameter value is within one standard deviation of the histogram peak, instructions for updating the default template parameter value using the data for the peak which is within one standard deviation of the default template parameter value;

responsive to a determination that the default template parameter value is within one standard deviation of the histogram peak, instructions for analyzing any peaks that are not within one standard deviation of the default template parameter value;

responsive to a determination that the default template parameter value is not within one standard deviation of the histogram peak, instructions for analyzing a histogram peak;

instructions for determining if a standard deviation for the histogram peak is less than the template creation threshold;

responsive to a determination that the standard deviation for the analyzed peak is less than the template creation threshold, instructions for creating a new template using the average from the analyzed peak, wherein the new template calculates the amount the customer will spend for the process upgrade.

36. The program product of claim 35 further comprising:

instructions for determining if the histogram contains more than one peak; and responsive to a determination that the histogram contains one peak, instructions for updating a default template parameter value.

37. The program product of claim 35 further comprising: repeating the steps in claim 16 for every parameter in the default template.

38. The program product of claim 35 wherein the instructions for updating the default template parameter value comprise: instructions for averaging a modified template parameter value with the default template parameter value to obtain an updated template parameter value.

39. The program product of claim 35 wherein the instructions for developing the data list comprise: instructions for adjusting a modified template parameter value using the effectiveness factor; and recording the modified template parameter value in the data list.

40. The program product of claim 35 wherein the effectiveness factor is determined using a second set of instructions comprising:

instructions for comparing the modified template to a default template;

instructions for increasing the effectiveness factor when a consultant does not have to modify a default template parameter value; and instructions for increasing the effectiveness factor when the default template accurately represents a company's processes.

* * * * *